(12) United States Patent
Yamamoto

(10) Patent No.: US 7,967,687 B2
(45) Date of Patent: Jun. 28, 2011

(54) JOINT STRUCTURE AND BOOT FOR JOINT

(75) Inventor: Masafumi Yamamoto, Mooka (JP)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 11/990,621

(22) PCT Filed: Aug. 28, 2006

(86) PCT No.: PCT/JP2006/316902
§ 371 (c)(1),
(2), (4) Date: Feb. 19, 2008

(87) PCT Pub. No.: WO2007/029548
PCT Pub. Date: Mar. 15, 2007

(65) Prior Publication Data
US 2009/0104999 A1   Apr. 23, 2009

(30) Foreign Application Priority Data

Sep. 1, 2005  (JP) ................................ 2005-253355
Oct. 4, 2005  (JP) ................................ 2005-291001

(51) Int. Cl.
*F16C 3/00* (2006.01)

(52) U.S. Cl. ........................................ 464/175; 277/636

(58) Field of Classification Search ................ 464/111, 464/173, 174, 175, 901; 277/634–636; 74/18, 74/18.1, 18.2; 403/50, 51; 92/34
See application file for complete search history.

(56) References Cited

U.S. PATENT DOCUMENTS

| 4,068,499 A | * | 1/1978 | Sharp | 464/115 |
| 4,926,979 A | * | 5/1990 | Odaka | 188/73.44 |
| 6,179,717 B1 | * | 1/2001 | Schwarzler | 464/175 |
| 2005/0245319 A1 | | 11/2005 | Sato | |

FOREIGN PATENT DOCUMENTS

| JP | 55-038010 | 3/1980 |
| JP | 02-062120 | 5/1990 |
| JP | 04-160229 | 6/1992 |
| JP | 04096624 | 8/1992 |
| JP | 04-106570 | 9/1992 |
| JP | 04-114132 | 10/1992 |
| JP | 06-185532 | 7/1994 |
| JP | 09-014283 | 1/1997 |
| JP | 09-096318 | 4/1997 |
| JP | 2001-099331 | 4/2001 |
| JP | 2004-263730 | 9/2004 |
| JP | 2004-301202 | 10/2004 |
| JP | 2006-300125 | 11/2006 |

OTHER PUBLICATIONS

Japanese Office Action dated Jun. 1, 2010.

* cited by examiner

*Primary Examiner* — Daniel P Stodola
*Assistant Examiner* — Jay R Ripley
(74) *Attorney, Agent, or Firm* — Squire, Sanders & Dempsey (US) LLP

(57) ABSTRACT

A flexible section is provided between a small-diameter tube section and a bellows section of a boot for a joint, and the flexible section has a greater flexibility than the small-diameter tube section. When a spline shaft is displaced so as to incline relative to a constant velocity joint, deformation stress acting in the boot is relaxed by allowing the flexible section to deflect (bend). This inhibits the inner wall surface of the small-diameter tube section from separating from the sidewall surface of the spline shaft.

7 Claims, 22 Drawing Sheets

JOINT STRUCTURE AND BOOT FOR JOINT

TECHNICAL FIELD

The present invention relates to a joint structure including a constant velocity universal joint and a shaft, and a joint boot surrounding the junction between the constant velocity universal joint and the shaft for protection.

BACKGROUND ART

Automobiles are propelled by rotating tires with the rotational drive power generated by an engine such as an internal combustion engine, a motor, or the like and transmitted from a differential gear through a plurality of transmission shafts such as a half shaft, a spline shaft, etc. to hubs. The transmission shafts are connected to each other by a constant velocity universal joint.

A joint structure 1 shown in FIG. 19 includes a Birfield constant velocity universal joint 3 by which a spline shaft 2 is connected to a hub, not shown. The Birfield constant velocity universal joint 3 includes a hollow outer member 4 having an open end, and a joint boot 5 is mounted on and extends between the outer member 4 and the end of the spline shaft 2. The joint boot 5 functions as a seal for holding a grease composition which fills the joint boot 5 and preventing external foreign matter such as water, mud, etc. from finding its way into the joint boot 5 (see, for example, Patent Document 1).

Since the outside diameter of outer member 4 is larger than the diameter of the spline shaft 2, the joint boot 5 comprises, as shown in FIG. 19, a large-diameter tube 6 in which the outer circumferential wall of the outer member 4 is inserted, a small-diameter tube 7 in which the spline shaft 2 is inserted, and a bellows 8 interposed between the large-diameter tube 6 and the small-diameter tube 7, the bellows 8 being progressively smaller in diameter from the large-diameter tube 6 to the small-diameter tube 7.

The joint boot 5 is made of rubber or resin and is flexible. When the automobile runs on a bumpy road, the spline shaft 2 is displaced so as to be tilted with respect to the outer member 4 of the Birfield constant velocity universal joint 3, causing the bellows 8 to flex to follow the displacement. As a result, the bellows 8 is brought into a state shown in FIG. 20.

As can be seen from FIG. 20, as the bellows 8 flexes, the inner circumferential wall of the small-diameter tube 7 near the bellows 8 is spaced from the spline shaft 2, causing a so-called peeled-off phenomenon. When such a phenomenon occurs, the grease composition filling the joint boot 5 may leak out. For this reason, as shown in FIGS. 19 and 21, it has been customary to tighten the small-diameter tube 7 around the circumferential side wall of the spline shaft 2 with a metal band 9 as a tightening member. The large-diameter tube 6 is also tightened around the outer circumferential wall of the outer member 4 by a metal band 10.

When the automobile is steered, the spline shaft 2 is displaced so as to tilt with respect to the outer member 4 of the Birfield constant velocity universal joint 3, and the bellows 8 flexes to follow the displacement.

At this time, as shown in FIG. 22, the large-diameter tube 6 tends to abut against the metal band 10 and the region of the bellows 8 which is closest to the large-diameter tube 6 tends to abut against the end face of the outer member 4. When a metal member such as the metal band 10 or the outer member 4 repeatedly abuts against the joint boot 5 which is made of rubber or resin, the joint boot 5 may possibly be damaged.

In order to avoid the above shortcoming, Patent Document 2 has proposed that the outside diameter of a valley disposed adjacent to the large-diameter tube be in the range from 80% to 90% of the outside diameter of the large-diameter tube, and that the wall thickness of a slanted portion of the valley which is closer to the large-diameter tube be greater than the wall thickness of other slanted portions of the bellows.

The small-diameter tube 7 may also possibly be damaged. Specifically, even though the small-diameter tube 7 is tightened by the metal band 9, it is difficult to fully prevent the small-diameter tube 7 from being peeled off, and the small-diameter tube 7 tends to be slightly peeled off. When the small-diameter tube 7 is peeled off, the metal band 9 abuts against a portion of the joint boot 5, causing that portion to subside. Therefore, if the small-diameter tube 7 is repeatedly peeled off, then the portion of the joint boot 5 which abuts against the metal band 9 may be damaged.

For the purpose of preventing the portion which abuts against the metal band from being damaged, Patent Document 3 has proposed that stiffening fins be provided on the outer surface of the bellows which is close to the small-diameter tube. Patent Document 4 has proposed that a joint boot have a recess for distributing the distortions.

Patent Document 1: Japanese Laid-Open Patent Publication No. 2004-263730;
Patent Document 2: Japanese Laid-Open Patent Publication No. 09-014283;
Patent Document 3: Japanese Laid-Open Patent Publication No. 2001-099331; and
Patent Document 4: Japanese Laid-Open Patent Publication No. 2004-301202.

DISCLOSURE OF THE INVENTION

However, according to either one of the technologies disclosed in Patent Documents 1 and 2, it is difficult to avoid abutment of the bellows against the metal band.

According to the technologies disclosed in Patent Documents 3 and 4, when the peeled-off phenomenon occurs, it is not possible to avoid abutment of the metal band against the joint boot. In other words, it is not possible to reliably prevent the joint boot from being damaged.

Furthermore, according to the technologies disclosed in Patent Documents 3 and 4, the small-diameter tube is tightened by a fastener which is heavy because its wall is thick. Using the heavy fastener is responsible for an increase in weight of the automobile.

It is a general object of the present invention to provide a joint structure which suppresses a peel-off phenomenon.

A major object of the present invention is to provide a joint structure which is less likely to cause damage to a joint boot even when a peel-off phenomenon occurs.

Another object of the present invention is to provide a joint structure which is capable of reducing a tightening force applied by a tightening member.

Still another object of the present invention is to provide a joint boot which is capable of preventing a bellows from abutting against a metal band and an outer member.

Yet still another object of the present invention is to provide a joint boot which is capable of reducing the number of parts making up a joint structure.

According to an embodiment of the present invention, there is provided a joint structure comprising a constant velocity universal joint, a shaft displaceably coupled to the constant velocity universal joint, and a joint boot having an end in which the constant velocity universal joint is inserted and another end in which the shaft is inserted, wherein the joint boot comprises a large-diameter tube in which an outer circumferential wall of an outer member of the constant velocity universal joint is inserted and which is tightened around the outer circumferential wall by a first tightening member, a small-diameter tube which has an inner circumferential wall held in abutment against a circumferential side wall of the shaft when the shaft is inserted in the small-diameter tube and which is tightened around the circumferential side wall by a second tightening member, and a bellows interposed between the large-diameter tube and the small-diameter tube and progressively smaller in diameter from the large-diameter tube to the small-diameter tube, the joint boot includes a flexible portion disposed between the small-diameter tube and the bellows, the flexible portion being more flexible than the small-diameter tube, and the flexible portion flexes earlier than the small-diameter tube when the shaft is displaced to a position tilted with respect to the outer member.

With the above joint structure, when the shaft is displaced so as to be tilted with respect to the outer member, deforming stresses that are applied to the joint boot are reduced when the flexible portion that is more easily flexible than the small-diameter tube flexes (is bent). Therefore, since forces acting on the small-diameter tube are greatly reduced, the small-diameter tube is less likely to be spaced from the shaft, i.e., is less likely to cause the peeled-off phenomenon. As the flexible portion which has flexed is prevented from abutting against the tightening member, the joint boot is not damaged.

In this case, since the small-diameter tube is less likely to be positionally displaced along the shaft, it is not necessary to apply large tightening forces to the small-diameter tube. Accordingly, the tightening member may be of a small wall thickness and lightweight. The joint structure and an apparatus incorporating the joint structure therein may thus be lightweight.

The flexible portion disposed between the small-diameter tube and the bellows of the joint boot reduces deforming stresses acting on the joint boot by flexing (being bent) when the shaft inserted in the small-diameter tube is displaced so as to be tilted with respect to the constant velocity universal joint. Therefore, the forces acting on the small-diameter tube are greatly reduced, and the small-diameter tube is prevented from peeling off. The joint boot will be free from damage which would otherwise be caused if the fastening member abutted against the joint boot. As the forces acting on the small-diameter tube are smaller, the small-diameter tube is less likely to be positionally displaced along the shaft.

According to the present invention, as described above, since the small-diameter portion is less likely to be peeled off and positionally displaced, the tightening forces of the tightening member are reduced. The tightening member may thus be of a small wall thickness. Since the tightening member of a small wall thickness is generally lightweight, the apparatus incorporating the joint structure, e.g., an automobile or the like, is also made lightweight.

For making the flexible portion more flexible than the small-diameter tube, the flexible portion may be smaller in wall thickness than the small-diameter tube.

Preferably, the bellows should have a peak closest to the small-diameter tube, the peak having a crest which is less flexible than the flexible portion. As deforming stresses concentrate more on the flexible portion, the small-diameter tube is more prevented from peeling off.

Preferably, at least either a region of the circumferential side wall of the shaft which is inserted in the inner circumferential wall of the small-diameter tube or the inner circumferential wall of the small-diameter tube has an annular groove defined therein. With this structure, even if the small-diameter tube is peeled off, a grease composition which fills the joint boot is trapped in the annular groove and hence is prevented from leaking out of the small-diameter tube.

At any rate, the shaft preferably includes a large-diameter portion and a small-diameter portion, the inner circumferential wall of the small-diameter tube of the joint bolt is preferably held in abutment against a cylindrical side wall of the small-diameter portion, and the small-diameter tube preferably has an end face held in abutment against an end face of the large-diameter portion. The small-diameter tube is thus blocked by the large-diameter portion of the shaft, making it easy to position the joint boot.

According to another embodiment of the present invention, there is also provided a joint boot comprising a large-diameter tube in which an outer member of a constant velocity universal joint is inserted, a small-diameter tube in which a shaft is inserted, and a bellows interposed between the large-diameter tube and the small-diameter tube and progressively smaller in diameter from the large-diameter tube to the small-diameter tube, wherein the large-diameter tube includes a surrounding portion surrounding an outer circumferential wall of the outer member, and a ridge disposed on an end of the surrounding portion facing the small-diameter tube and projecting diametrically inwardly from the surrounding portion, the ridge has an end face held in abutment against an end face of the outer member, and the bellows has a peak closest to the large-diameter tube, the peak having a base end interposed between diametrically inner and outer ends of the ridge on the other end face of the ridge.

Since the large-diameter tube has the ridge and the peak starts from a position somewhere on the end face of the ridge in the thickness direction thereof, the bellows is brought into abutment against the large-diameter tube when the bellows is caused to shrink. As the bellows is prevented from abutting against the outer member of the constant velocity universal joint, the bellows is prevented from damaged.

As the base of the peak is joined to the ridge, the junction between the large-diameter tube and the peak has a small wall thickness. Accordingly, the peak is easily extensible. Deforming stresses acting on the joint boot are greatly reduced when the peak is extended. As a result, forces tending to positionally displace the large-diameter tube from the constant velocity universal joint are greatly reduced.

According to the present invention, since the large-diameter tube is less likely to be positionally displaced, there is no need to mount a tightening member on the large-diameter tube. Therefore, the number of parts of the joint structure can be reduced. Even if a tightening member is mounted on the large-diameter tube, the tightening force of the tightening member may be small enough to reduce the weight of the joint structure. The tightening member which applies the small tightening force may have a small wall thickness, for example.

The surrounding portion preferably includes an inner circumferential wall having two annular ridges disposed thereon which project diametrically inwardly of the large-diameter tube, and the outer circumferential wall of the outer member should preferably have two annular recesses defined therein, the annular ridges being fitted respectively in the annular recesses. The large-diameter tube is further prevented from being positionally displaced. Alternatively, the inner circumferential wall of the surrounding member may have two annular recesses defined therein, and the outer circumferential wall of the outer member may have annular ridges disposed thereon, the annular ridges being fitted respectively in the annular recesses.

The surrounding portion preferably includes an outer circumferential wall having an annular groove defined therein between the two annular ridges or the annular recesses. Forces tending to peel off the large-diameter tube are reduced when the large-diameter tube flexes about the annular groove. Therefore, the large-diameter tube stops being peeled off at the first annular ridge or annular recess, and is prevented from being peeled off beyond the first annular ridge or annular recess.

The bellows preferably has peaks, and one of the peaks which is closest to the large-diameter tube preferably has a curved crest which is smaller in wall thickness than curved crests of the remaining peaks and valleys. The rigidity of the peak is minimized, allowing the peak to extend mostly easily. Therefore, deforming stresses acting on the joint boot are reduced when the peak closest to the large-diameter tube is extended. As a result, the large-diameter tube is less likely to be positionally displaced and peeled off.

BEST MODE FOR CARRYING OUT THE INVENTION

Preferred embodiments of joint structures and joint boots according to the present invention will be described in detail below with reference to the accompanying drawings.

First, a joint structure, which serves as a drive power transmitting mechanism for transmitting drive power from an engine to a tire, will be described below.

Figure 1:
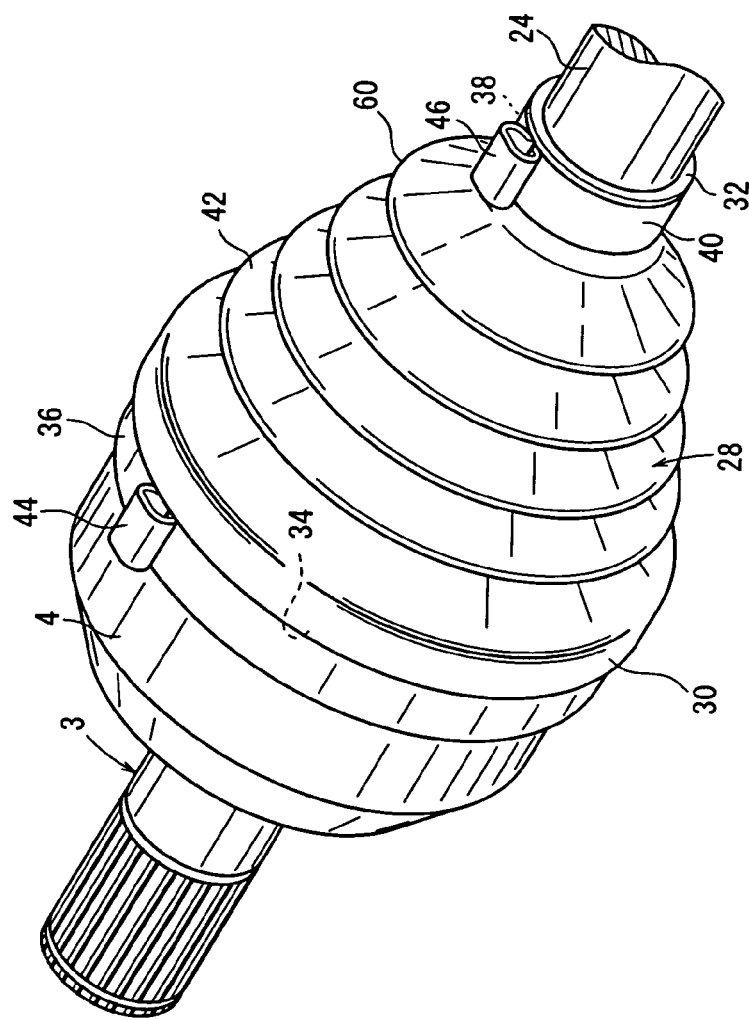
FIG. 1 is a schematic fragmentary perspective view of a joint structure according to an embodiment of the present invention.

FIG. 1 is a schematic fragmentary perspective view of a joint structure 20 (drive power transmitting mechanism) according to an embodiment of the present invention. In FIG. 1, the reference numerals 3, 24 represent a Birfield constant velocity universal joint and a spline shaft of a differential gear, not shown, respectively. A joint boot 28 is mounted on and extends between a portion of an outer member 4 of the Birfield constant velocity universal joint 3 and an end of the spline shaft 24.

The Birfield constant velocity universal joint 3 comprises the outer member 4 which is of a substantially semispherical shape with an opening, not shown, and an inner member (not shown) inserted in the outer member 4 and positioned and fixed to a circumferential side wall of the spline shaft 24. Each of a curved inner wall of the outer member 4 and the inner member has a plurality of ball grooves. A retainer is interposed between the outer member 4 and the inner member, and has windows defined in regions confronting the ball grooves. Rolling balls placed in the windows are inserted in the ball grooves in both of the outer member 4 and the inner member. The spline shaft 24 is thus tiltably coupled to the Birfield constant velocity universal joint 3.

As shown in FIG. 1, the joint boot 28 has a large-diameter tube 30 on one end thereof which has an opening diameter corresponding to the outside diameter of the outer member 4, and a small-diameter tube 32 on the other end in which the spline shaft 24 is inserted.

Figure 2:
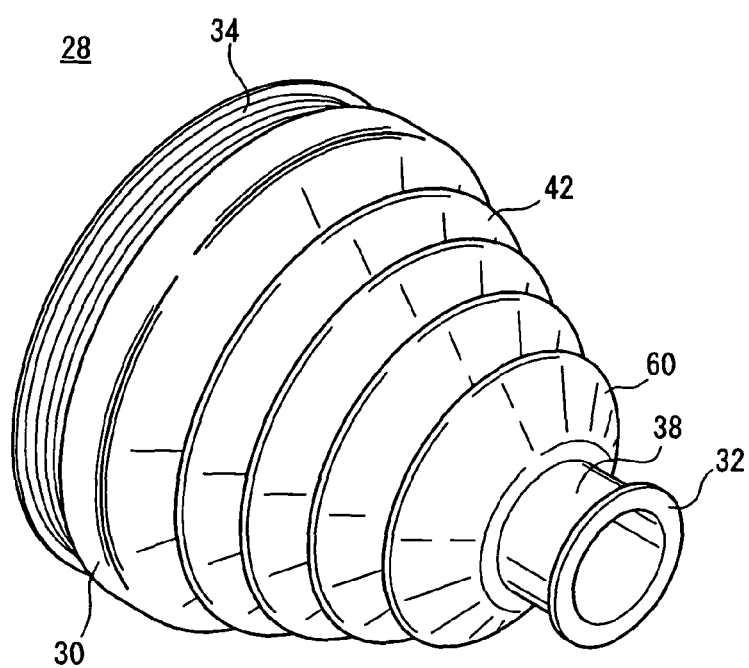
FIG. 2 is a schematic perspective view of an entire joint boot of the joint structure shown in FIG. 1.

As shown in FIG. 2, the large-diameter tube 30 has an annular band mounting groove 34 defined in an outer circumferential wall thereof and depressed across a predetermined width. A metal band 36 (see FIG. 1) is mounted in the band mounting groove 34. The metal band 36 has an outer circumferential surface partly pinched and crimped circumferentially by a crimping tool, not shown. The metal band 36 is thus tightened around the outer wall surface of the outer member 4 with the large-diameter tube 30 interposed therebetween. The large-diameter tube 30 is tightened around the outer circumferential wall of the outer member 4.

Similarly, the small-diameter tube 32 has an annular band mounting groove 38 defined in an outer circumferential wall thereof and depressed across a predetermined width. A metal band 40 is mounted in the band mounting groove 38. The metal band 40 has an outer circumferential surface partly pinched and crimped circumferentially by a crimping tool, not shown. As the metal band 40 is tightened around the circumferential side wall of the spline shaft 24 with the small-diameter tube 32 interposed therebetween, the small-diameter tube 32 is tightened around the circumferential side wall of the spline shaft 24. As shown at an enlarged scale in FIG. 3, the small-diameter tube 32 has a large wall thickness and an inner circumferential wall which extends straight.

Between the large-diameter tube 30 and the small-diameter tube 32, the joint boot 28 has a bellows 42 comprising an alternate succession of valleys and peaks and progressively reduced in diameter from the large-diameter tube 30 toward the small-diameter tube 32 (see FIGS. 1 and 2).

In FIG. 1, the reference numerals 44, 46 represent crimped portions which project a predetermined distance radially outwardly and which are formed when the outer circumferential surfaces of the metal bands 36, 40 are crimped.

Figure 3:
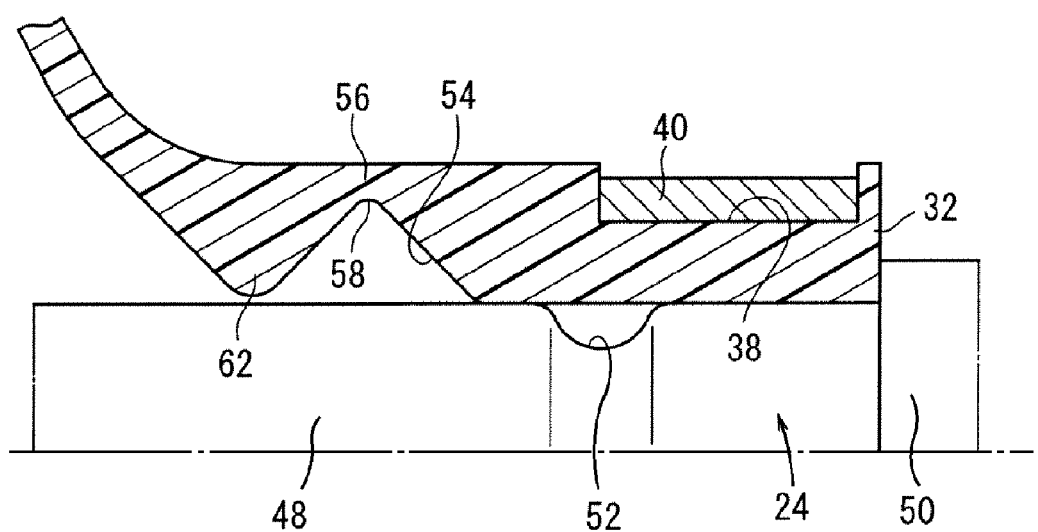
FIG. 3 is an enlarged fragmentary vertical cross-sectional view of a small-diameter tube and a nearby region of the joint boot shown in FIG. 2 and a portion of a spline shaft shown in FIG. 1 which is inserted in the small-diameter tube.

The spline shaft 24 has a small-diameter portion 48 and a large-diameter portion 50 which have different diameters (see FIG. 3). The diameter of the small-diameter portion 48 is slightly larger than the diameter of the opening of the small-diameter tube 32. The small-diameter portion 48 is press-fitted in the small-diameter tube 32. Since the inner circumferential wall of the small-diameter tube 32 is straight in shape, the inner circumferential wall as a whole is held in intimate contact with the circumferential side wall of the spline shaft 24.

The large-diameter portion 50 is not inserted in the small-diameter tube 32. When the spline shaft 24 is inserted in the small-diameter tube 32, the end face of the small-diameter tube 32 finally abuts against the distal end face of the large-diameter portion 50. The small-diameter tube 32 is thus positioned. The large-diameter portion 50 functions as a stopper for the joint boot 28.

The small-diameter portion 48 has an annular groove 52 defined therein. As described later, when small-diameter tube 32 is peeled off, a grease composition is trapped in the annular groove 52.

The joint boot 28 has a flexible portion 56 disposed between the small-diameter tube 32 and the bellows 42. The flexible portion 56 has a wall thickness smaller than the small-diameter tube 32 because of a recess 54. The recess 54 has a curved deepest end which provides a round corner 58.

The flexible portion 56 is smaller in rigidity than the small-diameter tube 32 because the wall thickness of the flexible portion 56 is smaller than the wall thickness of the small-diameter tube 32. Stated otherwise, the flexible portion 56 is more flexible than the small-diameter tube 32, and hence tends to flex earlier than the small-diameter tube 32.

The peaks of the bellows 42 include a first peak 60 closest to the flexible portion 56. The first peak 60 is larger in wall thickness than the other peaks. Therefore, the first peak 60 is higher in rigidity and less likely to flex than the other peaks.

The base of the first peak 60 which is closer to the flexible portion 56 includes a ridge 62 which protrudes to form the recess 54.

The joint boot 28 is filled with a grease composition before the outer member 4 and the spline shaft 24 are inserted respectively in the large-diameter tube 30 and the small-diameter tube 32.

The joint structure 20 according to the present embodiment is basically constructed as described above. Operation and advantages of the joint structure 20 will be described below.

To produce the joint structure 20 shown in FIG. 1, the small-diameter portion 48 of the spline shaft 24 is press-fitted into the small-diameter tube 32 of the joint boot 28 until finally the end face of the small-diameter tube 32 abuts against the distal end face of the large-diameter portion 50 (see FIG. 3). The joint boot 28 is thus positioned.

Since the spline shaft 24 has the small-diameter portion 48 and the large-diameter portion 50 and only the small-diameter portion 48 is inserted in the small-diameter tube 32 with the small-diameter tube 32 being blocked by the large-diameter portion 50, the joint boot 28 can easily be positioned.

According to the present embodiment, since the inner circumferential wall of the small-diameter tube 32 is of a straight shape, the inner circumferential wall is held in intimate contact with the circumferential side wall of the small-diameter portion 48 that is inserted in the small-diameter tube 32. Furthermore, since the small-diameter tube 32 is fitted over the small-diameter portion 48, the inner circumferential wall as a whole presses the circumferential side wall of the small-diameter portion. Consequently, the small-diameter tube 32 is not liable to be positioned displaced along the spline shaft 24. Therefore, the tightening force of the metal band 40 does not need to be excessively large.

The small-diameter tube 32 is tightened around the spline shaft 24 when the outer circumferential surface of the metal band 40 mounted in the band mounting groove 38 is partly crimped circumferentially by a non-illustrated crimping tool. As the outer circumferential surface of the metal band 40 is crimped, the protruding crimped portion 46 (see FIG. 1) is formed on the outer circumferential surface of the metal band 40.

The inner member is mounted on the distal end of the small-diameter portion 48 of the spline shaft 24 that is inserted in the small-diameter tube 32. The inner member, along with the small-diameter portion 48, is inserted in the outer member 4, and the retainer and the rolling balls are interposed between the inner member and the outer member 4. The rolling balls placed in the windows in the retainer are slidably inserted in the ball grooves that are defined in both the inner member and the inner circumferential wall of the outer member 4, thereby coupling the Birfield constant velocity universal joint 3 and the spline shaft 24 to each other.

Then, the outer member 4 of the Birfield constant velocity universal joint 3 is inserted in the large-diameter tube 30. Thereafter, the metal band 36 is mounted in the band mounting groove 34, and a portion of the outer circumferential surface of the metal band 36 is pinched and crimped circumferentially by a crimping tool, not shown. As the outer circumferential surface of the metal band 36 is crimped, the protruding crimped portion 44 is formed on the outer circumferential surface of the metal band 36.

In the manner described above, the outer circumferential wall of the outer member 4 and the circumferential side wall of the spline shaft 24 are inserted respectively in the large-diameter tube 30 and the small-diameter tube 32.

When the engine on the automobile is in operation, the rotational drive power is transmitted from the differential gear to the half shaft, a tripod constant velocity universal joint, the spline shaft 24, the Birfield constant velocity universal joints 3, and hubs, which rotate the tires to propel the automobile on the ground.

Figure 4:
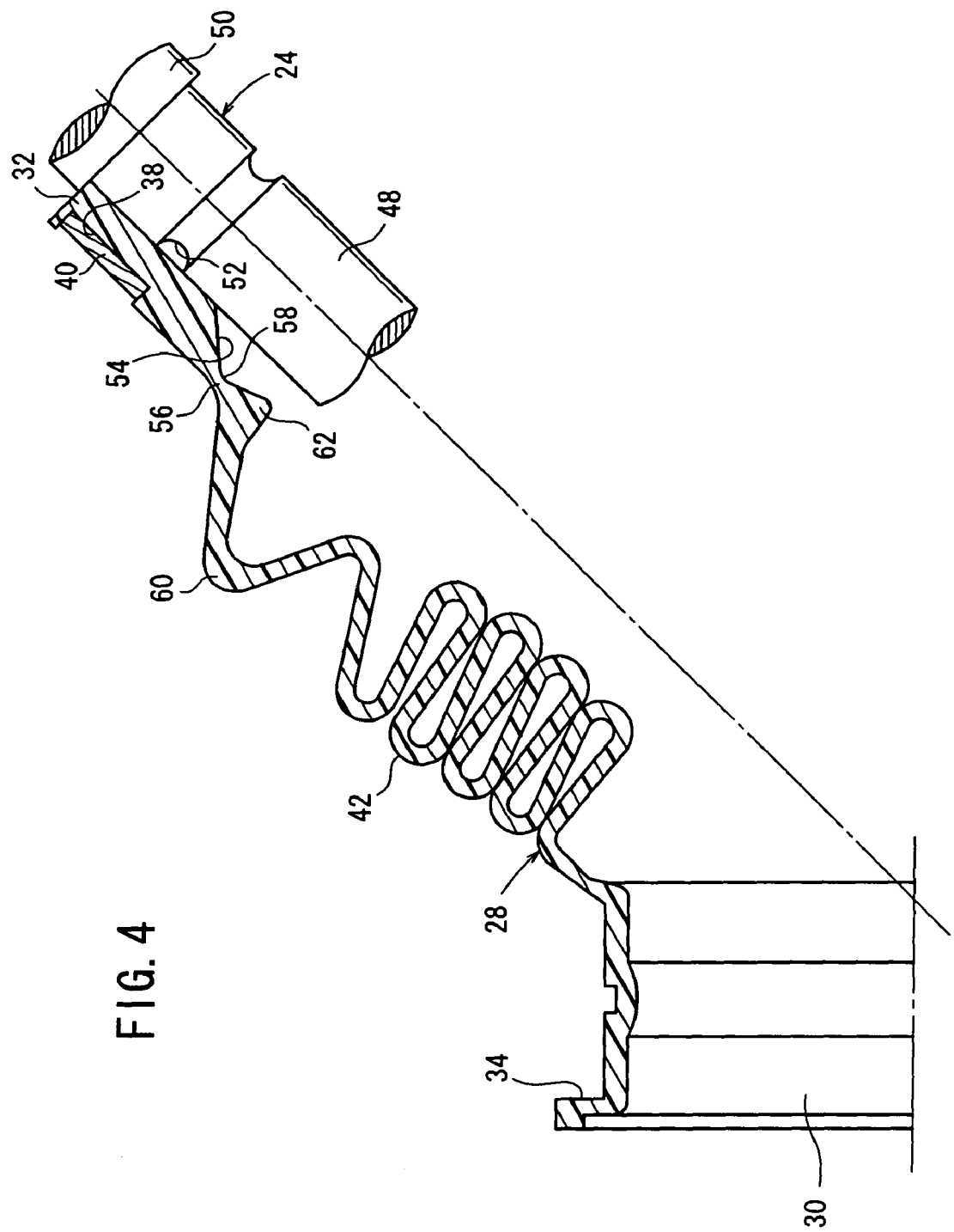
FIG. 4 is a vertical cross-sectional view, partly omitted from illustration, showing the manner in which the spline shaft is tilted with respect to a constant velocity universal joint.

When the automobile is running, the spline shaft 24 is displaced so as to be tilted with respect to the Birfield constant velocity universal joint 3 as the tires move vertically due to surface irregularities of the road, and reaches a state shown in FIG. 4, for example. In FIG. 4, only the joint boot 28 and a portion of the spline shaft 24 near the boundary between the small-diameter portion 48 and the large-diameter portion 50 are illustrated, with other members and regions being omitted from illustration.

At this time, the joint boot 28 follows the spline shaft 24 as it is displace and operated as the bellows 42 is expands and bends.

As described above, the first peak 60 of the bellows 42 is less likely to flex than the other peaks, and the small-diameter tube 32 is less likely to flex than the flexible portion 56. Therefore, the flexible portion 56 interposed between the first peak 60 and the small-diameter tube 32 flexes and bends earlier than the first peak 60 and the small-diameter tube 32, preventing the small-diameter tube 32 from peeling off. This is because deforming stresses that are applied to the joint boot 28 as the spline shaft 24 is displaced are reduced when the flexible portion 56 bends, and are preventing from reaching the small-diameter tube 32.

According to the present embodiment, specifically, the flexible portion 56 is interposed between the first peak 60 and the small-diameter tube 32, and flexes (bends) before the small-diameter tube 32 when the spline shaft 24 is displaced. Therefore, deforming stresses that are applied to the small-diameter tube 32 are greatly reduced, and hence the small-diameter tube 32 is prevented from peeling off. As a result, the grease composition is prevented from leaking out of the small-diameter tube 32.

Since the small-diameter tube 32 is prevented from peeling off, the bent flexible portion 56 is prevented from abutting against the metal band 40. Therefore, the flexible portion 56 is prevented from being damaged.

Furthermore, since the deepest end of the recess 54 is curved because of the round corner 58, the flexible portion 56 is prevented from cracking from the deepest end.

The end face of the small-diameter tube 32 abuts against and is blocked by the distal end surface of the large-diameter portion 50, and the deforming stresses acting on the small-diameter tube 32 are small. Therefore, the small-diameter tube 32 is less likely to positionally displace the large-diameter portion 50 or the small-diameter portion 48. As no excessively tightening forces do not need to be applied to the small-diameter tube 32, the metal band 40 may be of a smaller wall thickness than the metal band 9 used in the conventional joint structure 1. In other words, according to the present embodiment, the lightweight metal band 40 can be used, making it possible to reduce the weight of the automobile.

According to the present embodiment, therefore, since the small-diameter tube 32 has a less tendency to peel off and to be positionally displaced, the tightening forces of the metal band 40 may be small. As the metal band 40 may be of a small wall thickness, the weight of the automobile may be reduced. Furthermore, the tightening margin of the metal band 40 may be reduced.

After the flexible portion 56 has been bent to a maximum, if the spline shaft 24 is further tilted with respect to the Birfield constant velocity universal joint 3, then the inner circumferential wall of the small-diameter tube 32 may be slightly spaced from, i.e., peeled off, the circumferential side wall of the small-diameter portion 48. In this case, since the small-diameter portion 48 has the annular groove 52, the grease composition is trapped in the annular groove 52. Consequently, even if the peel-off phenomenon occurs, the grease composition is prevented from leaking out of the small-diameter tube 32.

When the joint boot 28 thus bends, the ridge 62 is displaced in a direction away from the small-diameter portion 48 in the region shown in FIG. 4. In a region which is 180° spaced circumferentially from the region shown in FIG. 4, the ridge 62 abuts against the small-diameter portion 48. The abutment prevents the joint boot 28 from being displaced excessively.

Figure 5:
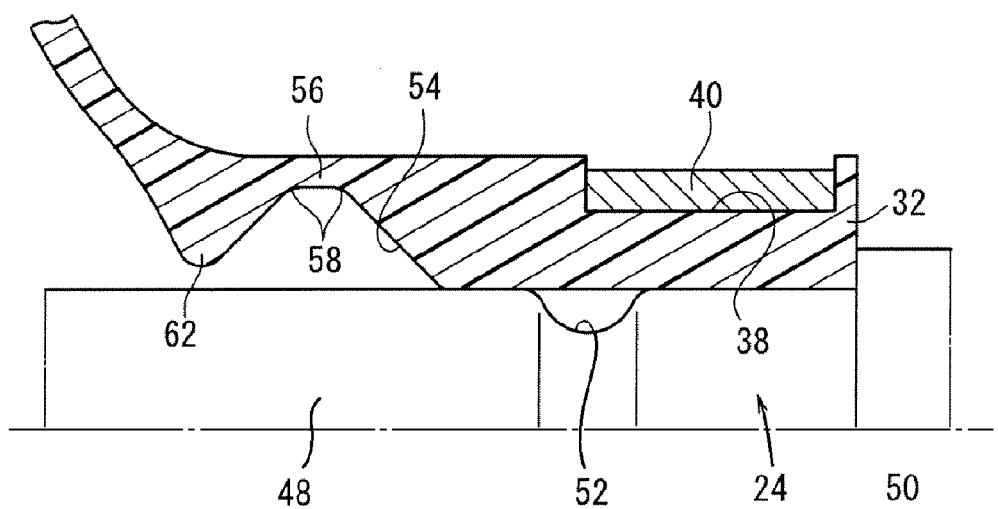
FIG. 5 is an enlarged fragmentary vertical cross-sectional view showing an embodiment in which two round corners are provided in a recess immediately below a flexible portion.

In the above embodiment, only one round corner 58 is provided in the deepest end of the recess 54. However, as shown in FIG. 5, two round corners 58 may be provided in the deepest end of the recess 54.

Figure 6:
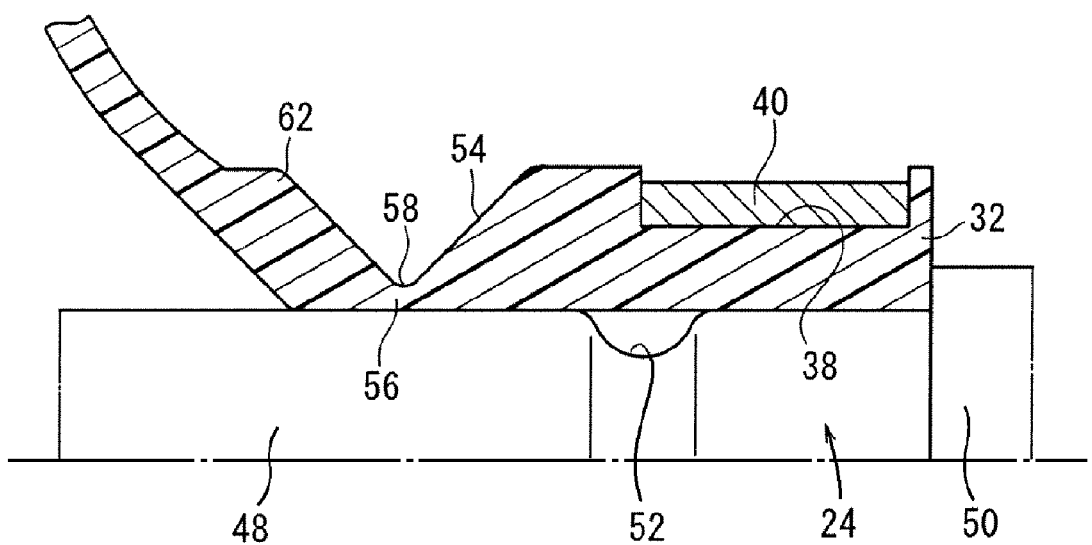
FIG. 6 is an enlarged fragmentary vertical cross-sectional view showing an embodiment in which a recess is provided immediately above a flexible portion.
Figure 7:
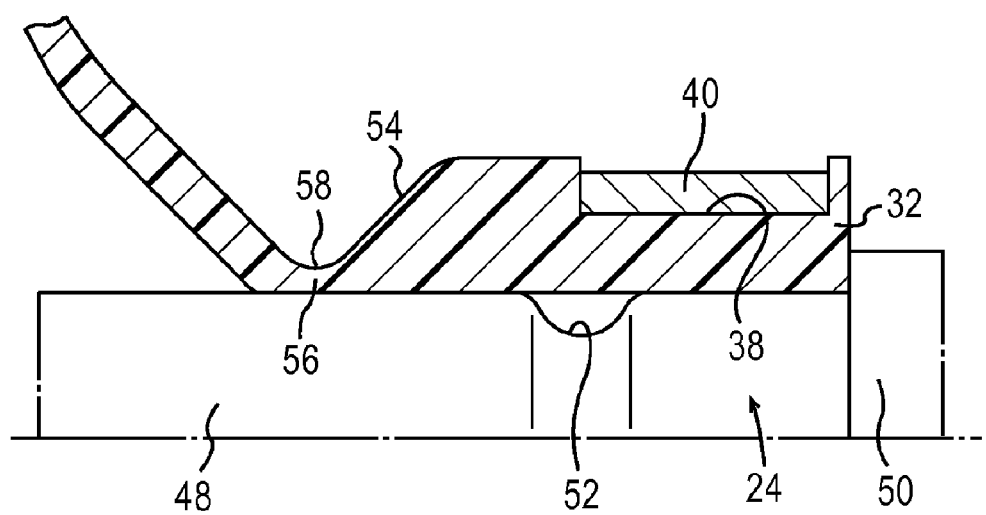
FIG. 7 is an enlarged fragmentary vertical cross-sectional view showing another embodiment in which a recess is provided immediately above a flexible portion.
Figure 8:
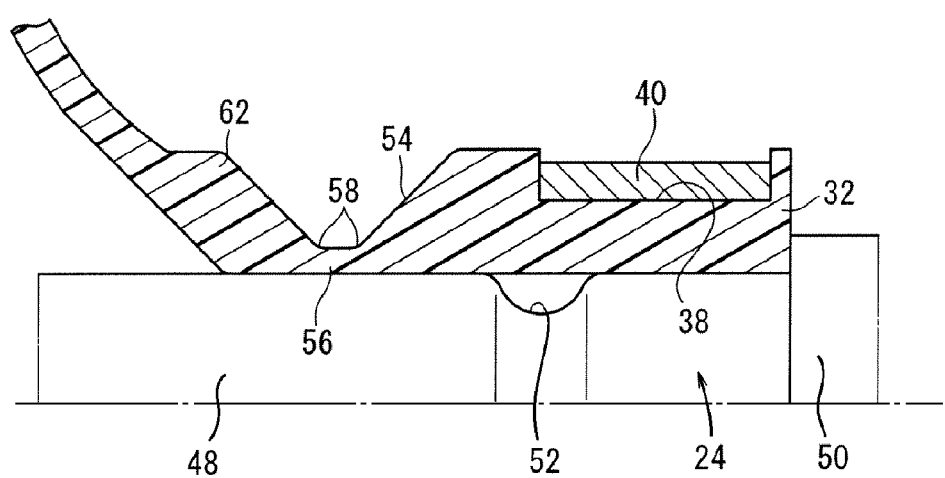
FIG. 8 is an enlarged fragmentary vertical cross-sectional view showing an embodiment in which two round corners are provided in a recess immediately above a flexible portion.

The flexible portion 56 is not limited to being spaced from the circumferential side wall of the spline shaft 24. As shown in FIGS. 6 and 7, the flexible portion 56 may be held in abutment against the circumferential side wall of the small-diameter portion 48 while the flexible portion 56 is not flexing. In this case, as shown in FIG. 8, two round corners 58 may be provided in the deepest end of the recess 54.

Figure 9:
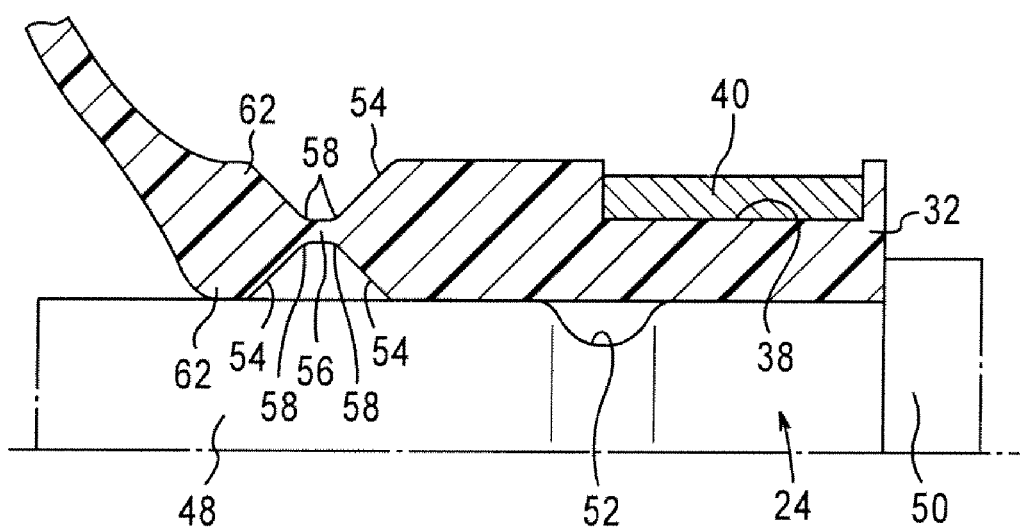
FIG. 9 is an enlarged fragmentary vertical cross-sectional view showing an embodiment in which recesses are provided immediately above and below a flexible portion.
Figure 10:
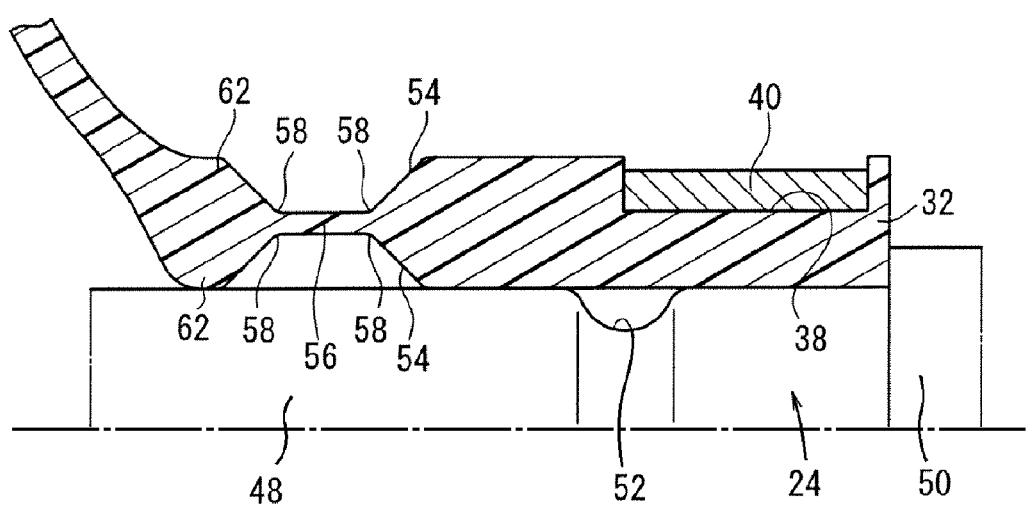
FIG. 10 is an enlarged fragmentary vertical cross-sectional view showing a longer flexible portion than the flexible portion according to the embodiment shown in FIG. 9.

As shown in FIG. 9, recesses 54 may be defined in respective upper and lower surfaces of the flexible portion 56 in its vertical cross section. If the length of the flexible portion 56 is increased as shown in FIG. 10, then the deforming stresses are further reduced.

Figure 11:
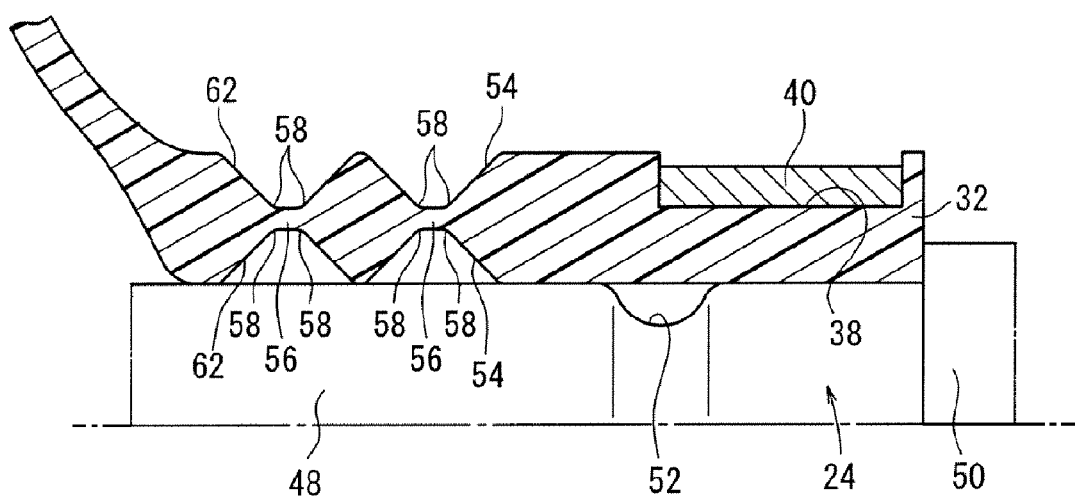
FIG. 11 is an enlarged fragmentary vertical cross-sectional view showing an embodiment in which a plurality of flexible portions are provided.

As shown in FIG. 11, a plurality of flexible portions 56 may be provided.

Figure 12:
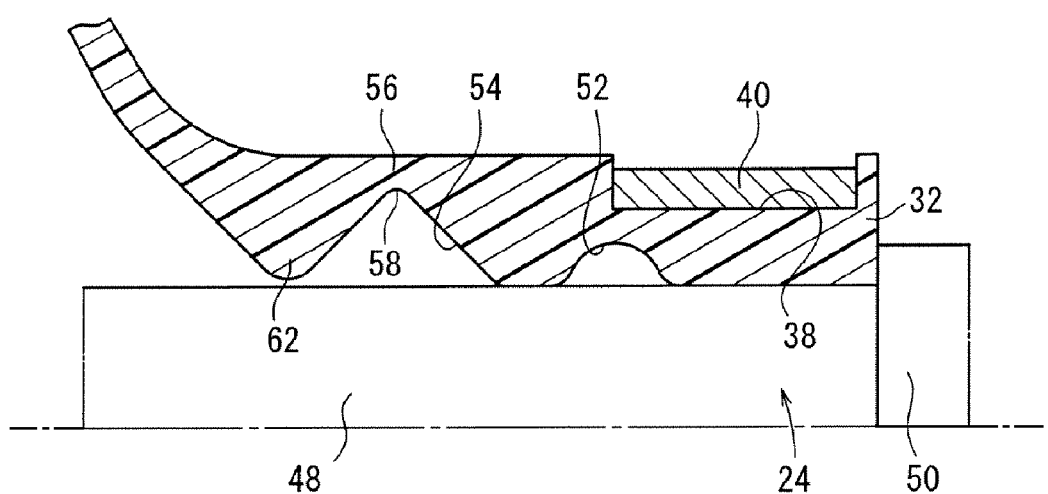
FIG. 12 is an enlarged fragmentary vertical cross-sectional view showing an embodiment in which an annular groove is defined in a small-diameter tube.

In any case, as shown in FIG. 12, the annular groove 52 may be defined in the small-diameter tube 32 or may be defined in both the small-diameter tube 32 and the circumferential side wall of the small-diameter portion 48.

In the embodiments shown in FIGS. 1 through 12, the ridge 62 is present on the joint boot 28. However, the ridge 62 is not indispensable, i.e., the ridge 62 may not be provided.

A preferred embodiment of a joint boot according to the present invention will be described in detail below with reference to the accompanying drawings.

Figure 13:
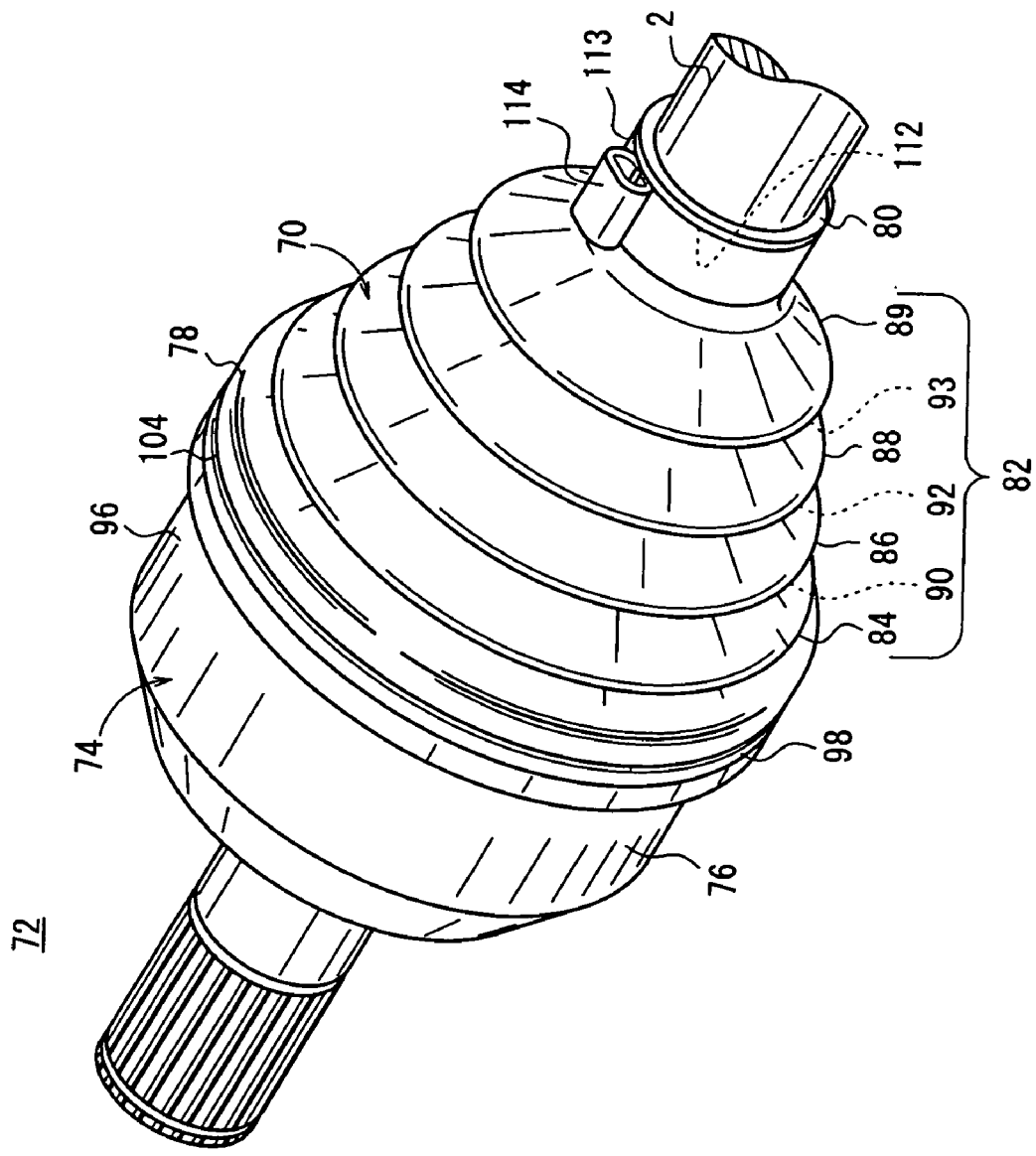
FIG. 13 is a schematic fragmentary perspective view of a joint structure incorporating a joint boot according to an embodiment of the present invention.

FIG. 13 is a schematic fragmentary perspective view of a joint structure 72 incorporating a joint boot 70 according to an embodiment of the present invention. The joint structure 72 serves as a drive power transmitting mechanism for transmitting drive power from an engine to a tire. In the joint structure 72, the joint boot 70 according to the present embodiment is mounted on and extends between a portion of an outer member 76 of a Birfield constant velocity universal joint 74 and an end of a spline shaft 2.

Figure 14:
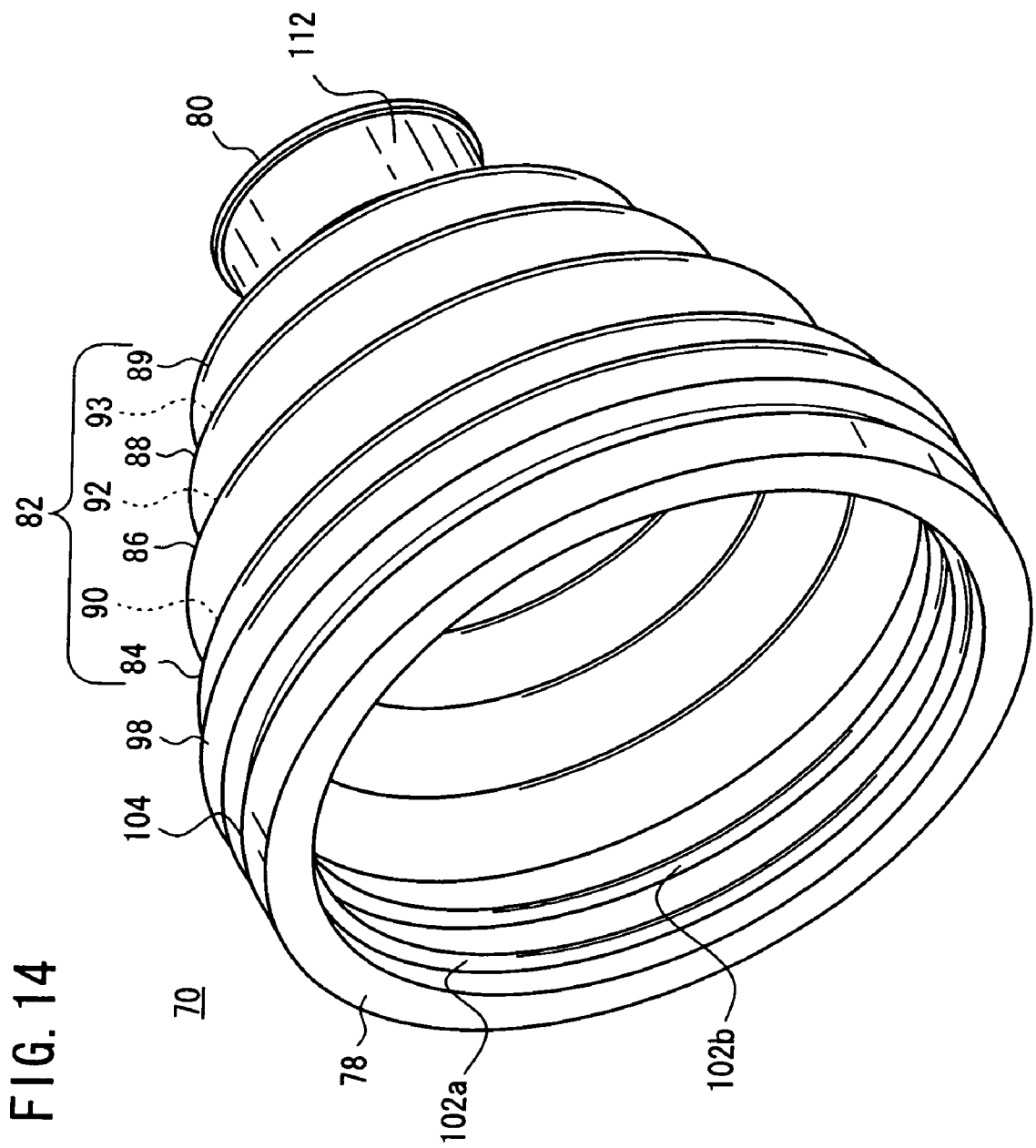
FIG. 14 is a schematic perspective view of the joint boot, in its entirety, shown in FIG. 13.
Figure 15:
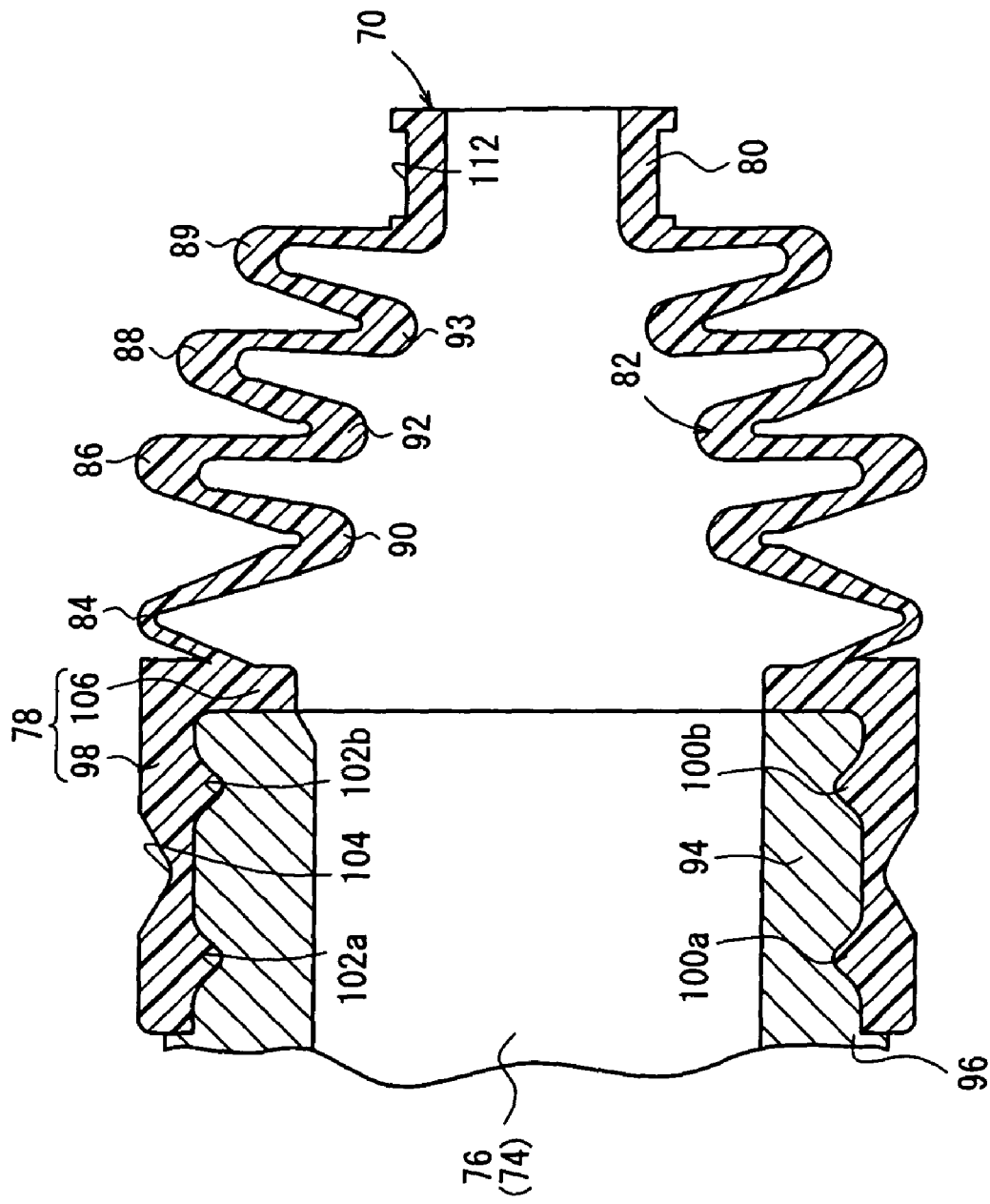
FIG. 15 is a schematic vertical axial cross-sectional view of the joint boot shown in FIG. 13.

FIG. 14 is a schematic perspective view of the joint boot 70 in its entirety, and FIG. 15 is a schematic vertical axial cross-sectional view of the joint boot 70. In FIG. 15, only the outer member 76 is inserted in the joint boot 70.

The joint boot 70 has a large-diameter tube 78 on one end thereof which has an opening diameter corresponding to the outside diameter of the outer member 76, and a small-diameter tube 80 on the other end in which the spline shaft 2 is inserted. Between the large-diameter tube 78 and the small-diameter tube 80, the joint boot 70 has a bellows 82 comprising an alternate succession of valleys and peaks and progressively reduced in diameter from the large-diameter tube 78 toward the small-diameter tube 80. On the bellows 82, the peak closest to the large-diameter tube 78 is referred to as a first peak, the peak adjacent to the first peak is referred to as a second peak, the peak adjacent to the second peak as a third peak, and the peak closest to the small-diameter tube 80 as a fourth peak, and they are denoted by respective reference numerals 84, 86, 88, 89. The valley between the first peak 84 and the second peak 86 is referred to as a first peak, the valley between the second peak 86 and the third peak 88 is referred to as a second valley, the valley between the third peak 88 and the fourth peak 89 is referred to as a third valley, and these valleys are denoted by respective reference numerals 90, 92, 93.

Figure 16:
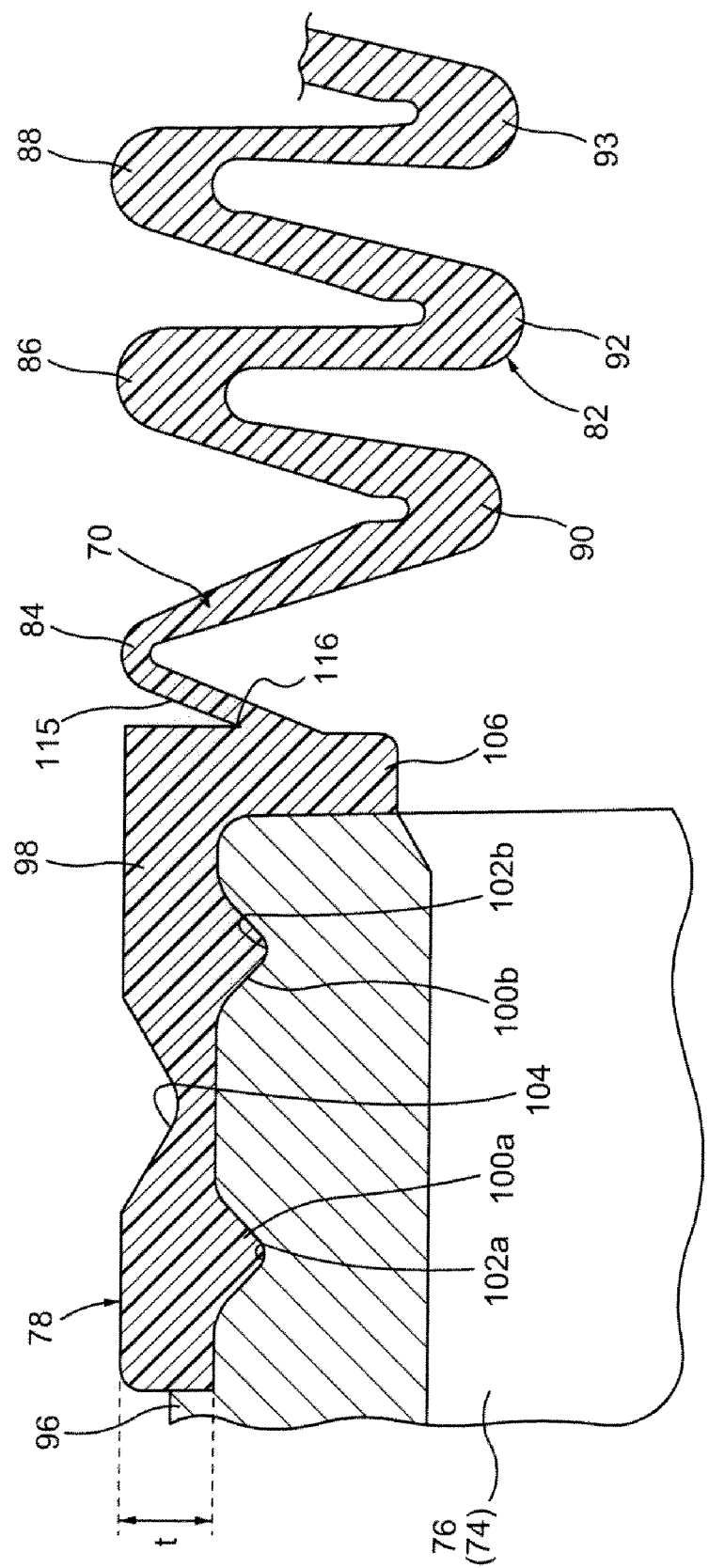
FIG. 16 is an enlarged fragmentary vertical cross-sectional view of the joint boot shown in FIG. 15.

As shown at an enlarged scale in FIG. 16, the outer member 76 has an outer circumferential wall which includes an annular recess defined therein near the end thereof, providing a small-diameter portion 94 and a large-diameter portion 96 which have different diameters. The small-diameter portion 94 is inserted in the large-diameter tube 78, which has an end face abutting against and blocked by an end face of the large-diameter portion 96.

With the small-diameter portion 94 being inserted in the large-diameter tube 78, the outer circumferential wall of the small-diameter portion 94 is surrounded by a surrounding portion 98 of the large-diameter tube 78. The surrounding portion 98 has an inner circumferential wall having two annular ridges 100a, 100b which project diametrically inwardly. The outer circumferential wall of the small-diameter portion 94 has annular grooves 102a, 102b defined therein which are spaced from each other by a predetermined distance. The annular ridges 100a, 100b are fitted respectively in the annular grooves 102a, 102b.

The surrounding portion 98 has an outer circumferential wall having an annular V-groove 104 of a substantially V-shaped cross section defined therein between the annular ridges 100a, 100b. As described later, the surrounding portion 98 flexes about the annular V-groove 104. In other words, the annular V-groove 104 makes the surrounding portion 98 flexible.

The distance from the diametrically inner end to diametrically outer end of the surrounding portion 98 held in abutment against the large-diameter portion 96, i.e., the thickness t of the surrounding portion 98, is greater than that of the small-diameter tube 80. As shown in FIGS. 13 through 16, the outer circumferential wall of the surrounding portion 98 does not have a mounting groove for winding a metal band therein. According to the present embodiment, therefore, the large-diameter tube 78 is not tightened by a metal band (see FIGS. 13, 15, and 16).

An annular ridge 106 protrudes diametrically inwardly 15 from and is joined to the end of the surrounding portion 98 on the side of the small-diameter tube 80 (see FIGS. 13 through 16). The annular ridge 106 has an end face held in abutment against the end face of the small-diameter portion 94 (see FIGS. 15 and 16). The first peak 84 has a base having a slanted base wall 115 and a base end 116 joined to the other end face of the annular ridge 106. Stated otherwise, the first peak 84 rises from the base end 116 thereof which is disposed on the end face of the annular ridge 106.

The base end 116 of the first peak 84 is spaced substantially equal distances from the diametrically outer and inner ends of the annular ridge 106. In other words, the base end 116 of the first peak 84 is present substantially intermediate in the thicknesswise direction of the end face of the annular ridge 106.

The wall thickness of the curved crest of the first peak 84 of the bellows 82 which is closest to the large-diameter tube 78 is smaller than the thicknesses of the curved crests of the first valley 90, the second peak 86, the second valley 92, the third peak 88, the third valley 93, and the fourth peak 89. Therefore, the curved crest of the first peak 84 is of the lowest rigidity and most flexible of the bellows 82.

A slanted wall extending from the first peak 84 to the first valley 90 is greater in wall thickness than the curved crest of the first peak 84.

As shown in FIGS. 13 and 14, the small-diameter tube 80 has an annular band mounting groove 112 depressed across a predetermined width, and a tightening metal band 113 (see FIG. 13) is mounted in the band mounting groove 112. The metal band 113 has an outer circumferential surface partly pinched and crimped circumferentially by a crimping tool, not shown. The metal band 113 is thus tightened around the circumferential side wall of the spline shaft 2 with the small-diameter tube 80 interposed therebetween. The small-diameter tube 80 is thus tightened around the circumferential side wall of the spline shaft 2. In FIG. 13, the reference numeral 114 represents a crimped portion which projects a predetermined distance radially outwardly and which are formed when the outer circumferential surface of the metal band 113 is crimped.

The joint boot 70 is filled with a grease composition before the outer member 76 and the spline shaft 2 are inserted respectively in the large-diameter tube 78 and the small-diameter tube 80.

The joint boot 70 according to the present embodiment is basically constructed as described above. Operation and advantages of the joint boot 70 will be described below.

To produce the joint structure 72, the spline shaft 2 is press-fitted into the small-diameter tube 80 of the joint boot 70, and the small-diameter portion 94 of the outer member 76 is inserted into the large-diameter tube 78. At this time, the small-diameter portion 94 of the outer member 76 is surrounded by the surrounding portion 98 of the large-diameter tube 78. Eventually, the end face of the surrounding portion 98 abuts against the end face of the large-diameter portion 96 of the outer member 76, and an end face of the annular ridge 106 abuts against the end face of the small-diameter portion 94, positioning the joint boot 70.

The joint boot 70 can easily be positioned when the end face of the annular ridge 106 of the joint boot 70 abuts against the end face of the small-diameter portion 94 of the outer member 76. The annular ridge 106 thus functions as a stopper.

At this time, the large-diameter tube 78 of the joint boot 70 is blocked by the large-diameter portion 96 of the outer member 76. Therefore, the joint boot 70 can be positioned with greater ease.

When the small-diameter portion 94 is inserted in the surrounding portion 98, the annular ridges 100a, 100b on the inner circumferential wall of the surrounding portion 98 are fitted respectively in the annular grooves 102a, 102b defined in the outer circumferential wall of the small-diameter portion 94. Because the annular ridges 100a, 100b are fitted respectively in the annular grooves 102a, 102b, the joint boot 70 is prevented from being positionally displaced without the need for a tightening metal band. Since the surrounding portion 98 is of a large wall thickness, the tightening forces applied from the surrounding portion 98 to the small-diameter portion 94 are large, making it more effective to prevent the large-diameter tube 78 from being positionally displaced. Therefore, there is no need for a metal band which would be tightened around the large-diameter tube 78.

The inner member is mounted on the distal end of the spline shaft 2 that is inserted in the small-diameter tube 80. The inner member, along with the distal end of the spline shaft 2, is inserted in the outer member 76, and the retainer and the rolling balls are interposed between the inner member and the outer member 76. The rolling balls placed in the windows in the retainer are slidably inserted in the ball grooves that are defined in both the inner member and the inner circumferential wall of the outer member 76, thereby coupling the Birfield constant velocity universal joint 74 and the spline shaft 2 to each other.

Thereafter, the tightening metal band 113 (see FIG. 13) is mounted in the band mounting groove 112 of the small-diameter tube 80, and the outer circumferential surface of the metal band 113 is partly pinched and crimped circumferentially by a crimping tool, not shown. When the metal band 113 is crimped, the projecting crimped portion 114 is formed on the outer circumferential surface of the metal band 113.

Figure 17:
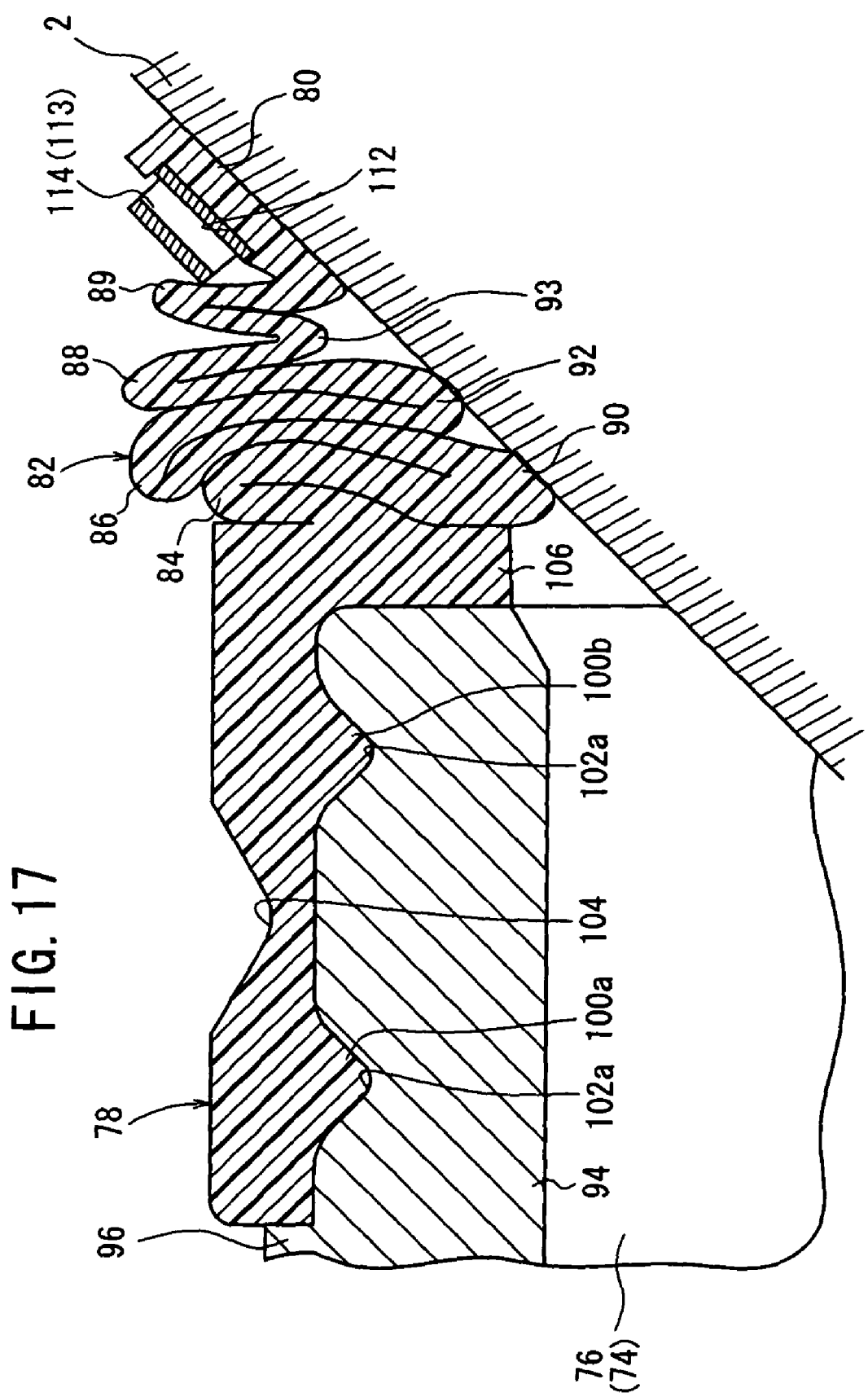
FIG. 17 is a vertical cross-sectional view, partly omitted from illustration, showing the manner in which a spline shaft is tilted with respect to a Birfield constant velocity universal joint.

When the automobile is steered, the spline shaft 2 is displaced so as to be tilted with respect to the Birfield constant velocity universal joint 74. When the steering angle becomes maximum, for example, a state shown in FIG. 17 is reached. At this time, the bellows 82 of the joint boot 70 is shrunk, and the slanted walls of the first and second peaks 84, 86 closer to the first valley 90, the slanted walls of the second and third peaks 86, 88 closer to the second valley 92, and the slanted walls of the third and fourth peaks 88, 89 closer to the third valley 93 are brought into abutment against each other. An inner surface of the first valley 90 abuts against the end face of the annular ridge 106, preventing the bellows 82 from further shrinking toward the large-diameter tube 78. At the same time, the curved crest of the first valley 90 and the base of the second peak 86 are pulled toward the annular ridge 106.

As the base of the second peak 86 is thus pulled, the curved crest and slanted wall of the second peak 86, which project from the first peak 84, are caused to flex slightly toward the first peak 84. When the slanted wall of the second peak 86 flexes, the slanted wall of the third peak 88 that abuts against it flexes so as to follow the flexure of the second peak 86. As a result, the curved crest of the third peak 88 is caused to flex slightly toward the first peak 84, and so is the curved crest of the fourth peak 89.

According to the present embodiment, therefore, the bellows 82 flexes in a direction away from the tilted spline shaft 2. The large-diameter tube 78 is pressed by the bellows 82, so that the large-diameter tube 78 is prevented from being positionally displaced on the small-diameter portion 94 of the outer member 76.

As the inner surface of the slanted wall by which the first peak 84 and the first valley 90 are joined to each other abuts against the annular ridge 106, i.e., the joint boot 70 made of rubber or resin, shocks produced upon the abutment are greatly reduced. Therefore, the bellows 82 does not tend to be damaged.

The base end of the first peak 84 is present near the large-diameter tube 78, and the curved crest of the first peak 84 is more likely to expand and contract than the curved crests of the first valley 90, the second peak 86, the second valley 92, the third peak 88, the third valley 93, and the fourth peak 89. Consequently, stresses tending to cause the bellows 82 to expand and contract are reduced when the first peak 84 expands and contracts. Since the stresses acting on the large-diameter tube 78 are greatly reduced, the large-diameter tube 78 is prevented from being positionally displaced.

Figure 18:
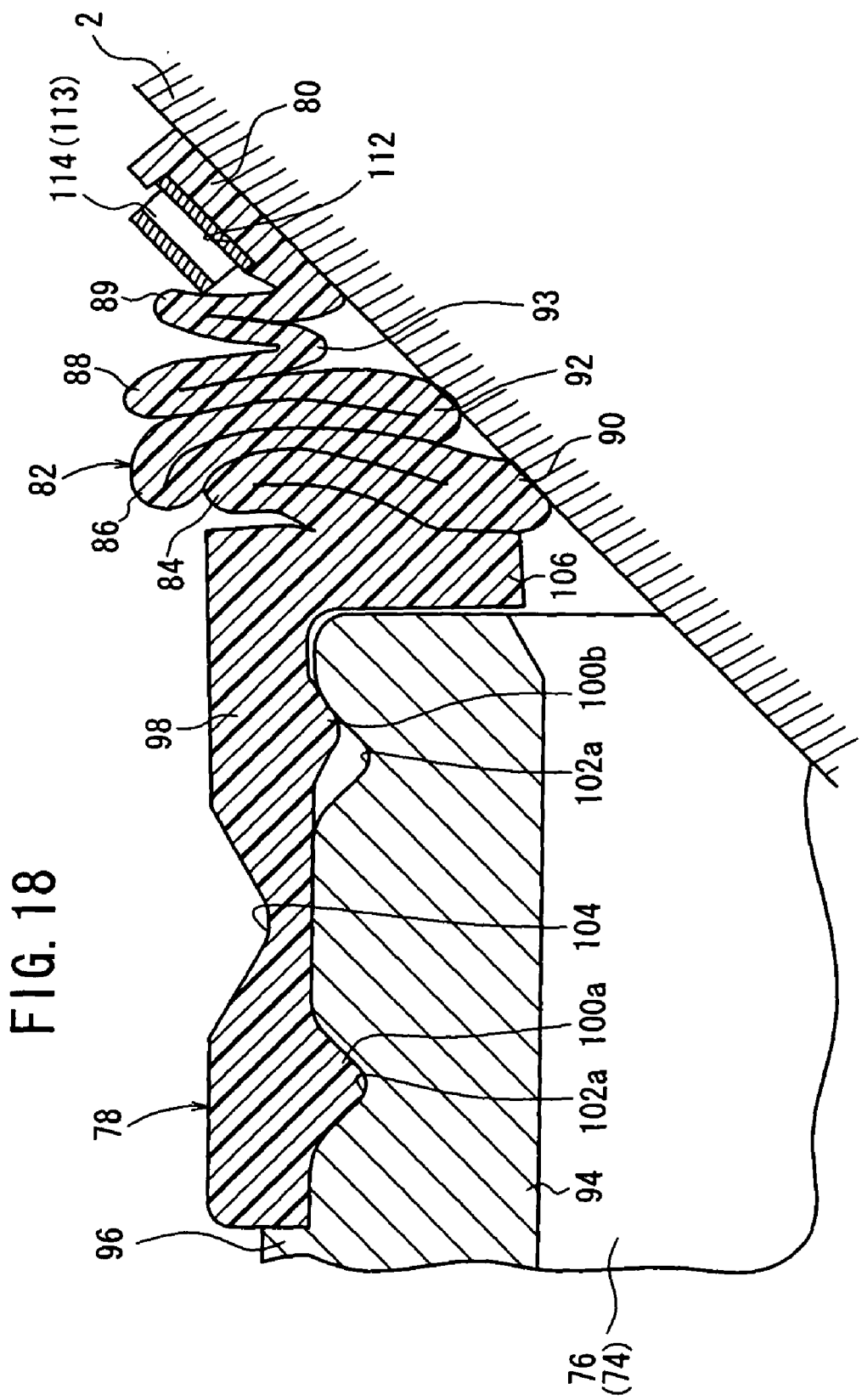
FIG. 18 is an enlarged fragmentary vertical cross-sectional view showing the manner in which a portion of a large-diameter tube is peeled off as the spline shaft is progressively tilted.
Figure 19:
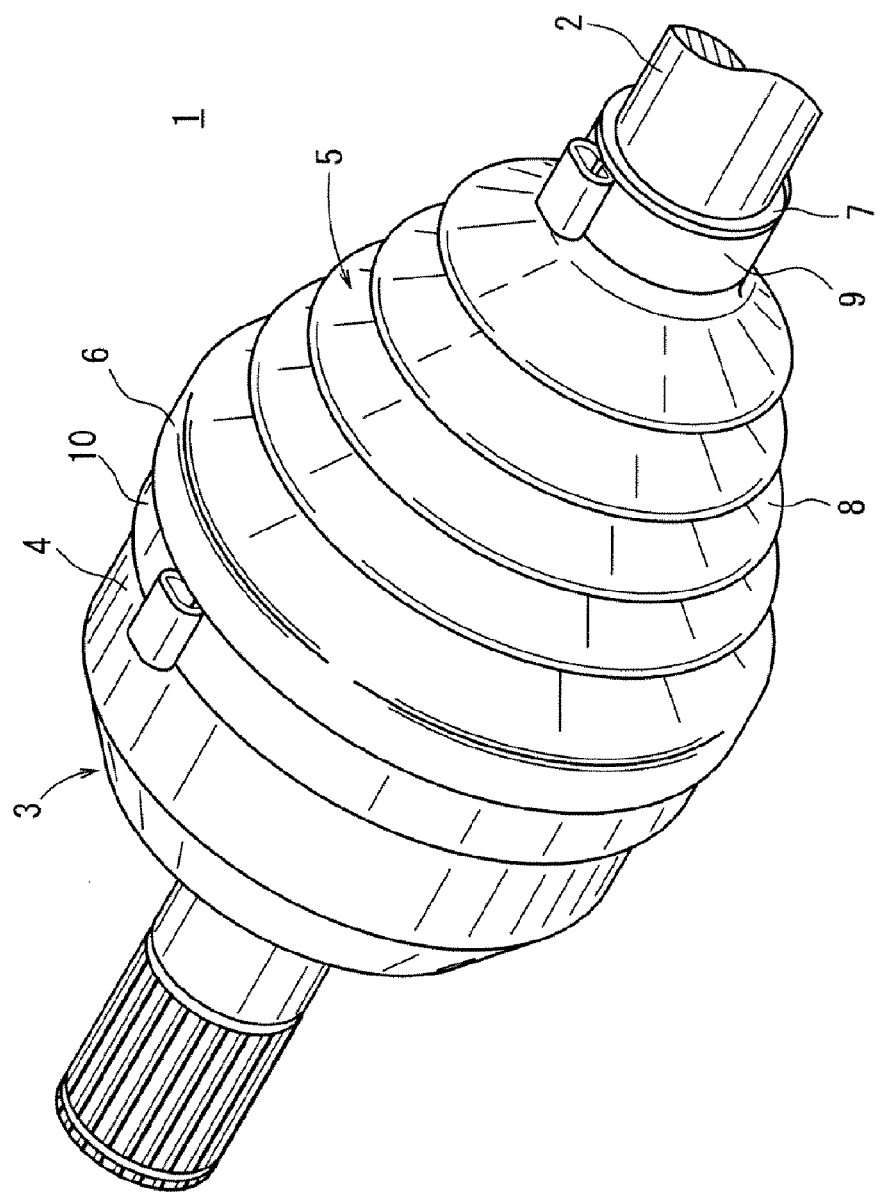
FIG. 19 is a schematic fragmentary perspective view of a joint structure incorporating a general joint boot.
Figure 20:
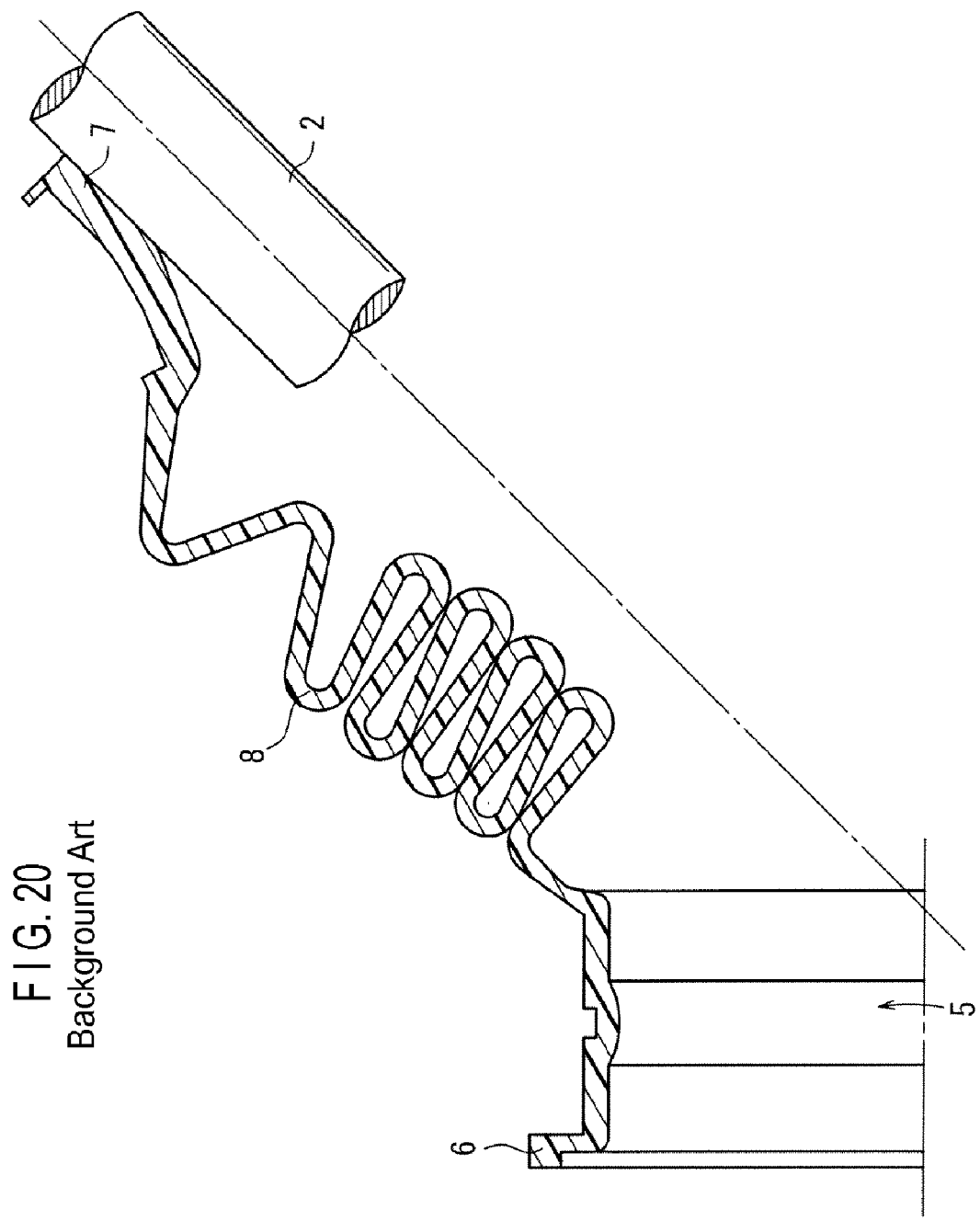
FIG. 20 is an enlarged fragmentary vertical cross-sectional view of a small-diameter tube and a nearby region of a joint boot of a conventional joint structure and a portion of a spline shaft which is inserted in the small-diameter tube.
Figure 21:
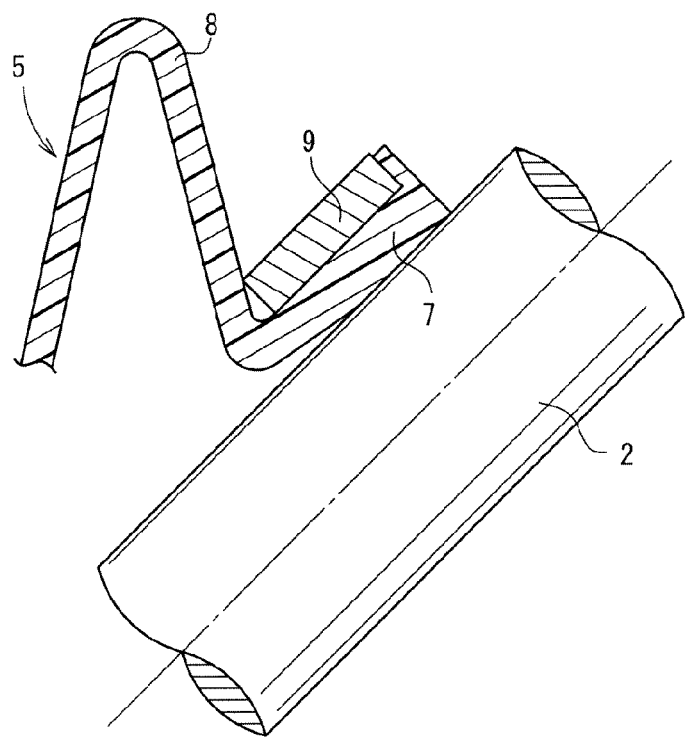
FIG. 21 is an enlarged fragmentary vertical cross-sectional view of the small-diameter portion which is peeled off and the nearby region of the joint structure show in FIG. 20.
Figure 22:
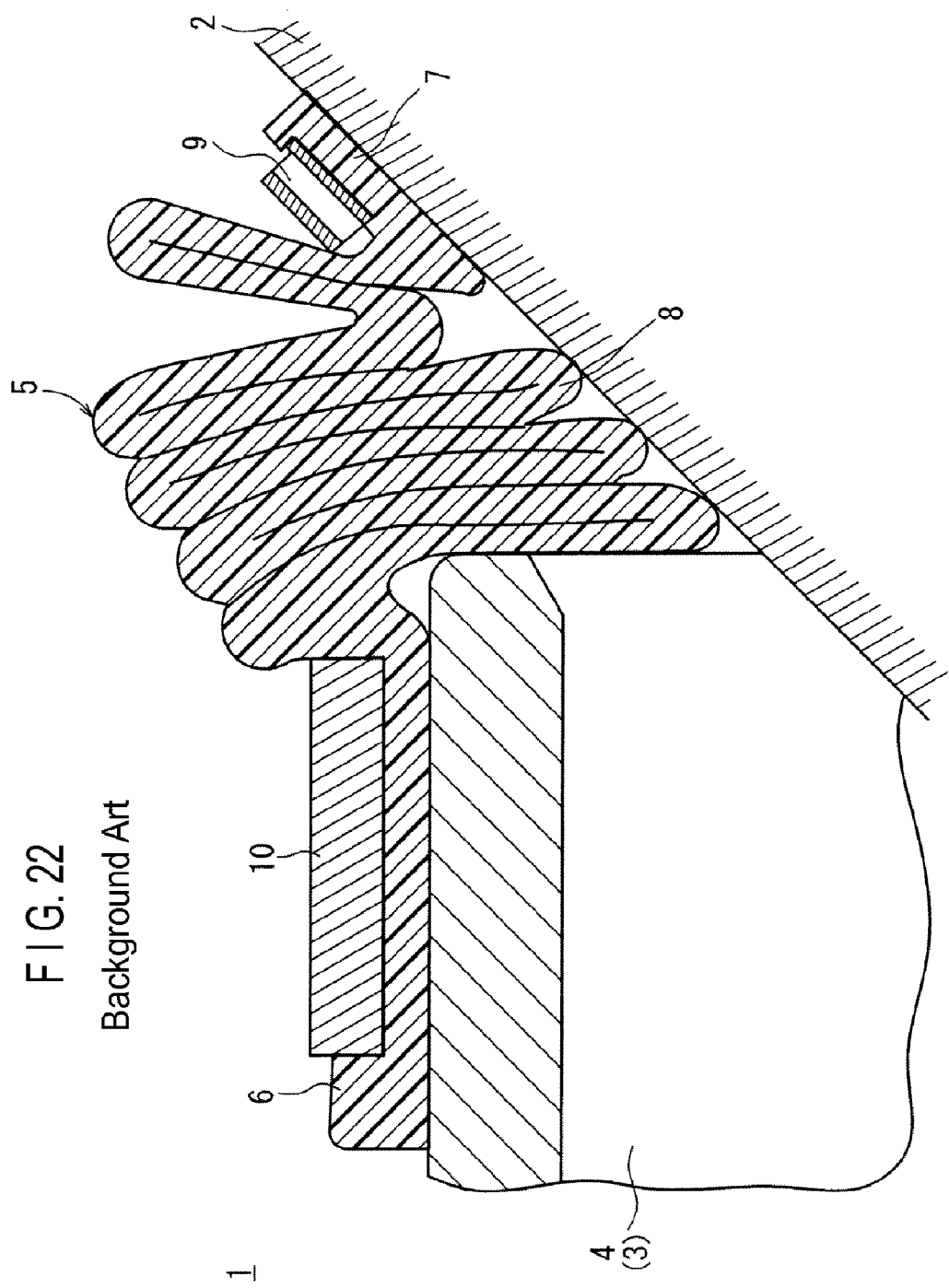
FIG. 22 is a vertical cross-sectional view, partly omitted from illustration, showing the manner in which a spline shaft is tilted with respect to a Birfield constant velocity universal joint, in the joint structure shown in FIG. 19.

As shown in FIG. 18, even when the large-diameter tube 78 are peeled off up to the region where the annular ridge 100b is disposed, the surrounding portion 98 flexes about the annular V-groove 104 that is positioned between the annular ridge 100a and the annular ridge 100b. Therefore, since the forces peeling off the large-diameter tube 78 are reduced, the large-diameter tube 78 is prevented from being further peeled off.

According to the present embodiment, specifically, the large-diameter tube 78 includes a flexible portion, which flexes (bends) when the spline shaft 2 is displaced so as to be tilted. Therefore, the deforming stresses acting on the large-diameter tube 78 are greatly reduced, and the large-diameter tube 78 is prevented from being peeled off. As a result, the grease composition is prevented from leaking out of the large-diameter tube 78.

According to the present embodiment, consequently, the large-diameter tube 78 is less likely to be positionally displaced and to be peeled off. Therefore, it is not necessary to tighten the large-diameter tube 78 with a metal band. In other words, the number of parts making up the joint structure 72 is reduced. This means that the weight of the automobile which incorporates the joint structure 72 is reduced.

In the above embodiment, the large-diameter tube 78 is not tightened by a metal band. However, the large-diameter tube 78 may be tightened by a metal band. Since the large-diameter tube 78 is less likely to be positionally displaced, the tightening force of the metal band may be small. As a metal band of a wall thickness may be used, the weight of the automobile may be reduced.

Furthermore, inasmuch as the tightening margin of the metal band can be reduced, the crimped portion can be prevented from interfering with the body of the automobile. In other words, inasmuch as the space taken up by the crimped portion can be reduced, devices can be positioned much more freely around the crimped portion.

The constant velocity universal joint on which the joint boot 70 is mounted is not limited to the Birfield constant velocity universal joint 74 shown in FIG. 13, but may be a constant velocity universal joint of another type such as a tripod constant velocity universal joint or the like.

The annular grooves 102a, 102b may be defined in the inner circumferential wall of the surrounding portion 98, and the annular ridges 100a, 100b may be disposed on the outer circumferential wall of the outer member 76.

The invention claimed is:

1. A joint structure comprising:
   a constant velocity universal joint,
   a shaft displaceably coupled to said constant velocity universal joint, and
   a joint boot having an end in which said constant velocity universal joint is inserted and another end in which said shaft is inserted,
   wherein said joint boot comprises a large-diameter tube in which an outer circumferential wall of an outer member of said constant velocity universal joint is inserted and which is tightened around said outer circumferential wall by a first tightening member, a small-diameter tube which has an inner circumferential wall held in abutment against a circumferential side wall of said shaft when said shaft is inserted in said small-diameter tube and which is tightened around said circumferential side wall by a second tightening member, and a bellows interposed between said large-diameter tube and said small-diameter tube and progressively smaller in diameter from said large-diameter tube to said small-diameter tube;
   said joint boot includes a flexible portion disposed between said small-diameter tube and said bellows, said flexible portion being more flexible than said small-diameter tube; and
   said flexible portion flexes earlier than said small-diameter tube when said shaft is displaced to a position tilted with respect to said outer member, wherein said bellows of said joint boot has a peak closest to said small-diameter tube, said peak having a crest which is less flexible than said flexible portion;
   wherein said flexible portion of said joint boot is smaller in wall thickness than said small-diameter tube;
   wherein said flexible portion of said joint boot is smaller in wall thickness than said peak closest to said small-diameter tube.

2. A joint structure according to claim 1, wherein at least either a region of the circumferential side wall of said shaft which is inserted in the inner circumferential wall of said small-diameter tube of said joint boot or the inner circumferential wall of said small-diameter tube has an annular groove defined therein.

3. A joint structure according to claim 1, wherein said shaft includes a large-diameter portion and a small-diameter portion, the inner circumferential wall of said small-diameter tube of said joint boot is held in abutment against a cylindrical side wall of said small-diameter portion, and said small-diameter tube has an end face held in abutment against an end face of said large-diameter portion.

4. A joint boot comprising:
   a large-diameter tube in which an outer member of a constant velocity universal joint is to be inserted,
   a small-diameter tube in which a shaft is to be inserted, and
   a bellows interposed between said large-diameter tube and said small-diameter tube, said bellows having peaks that are progressively smaller in diameter from said large-diameter tube to said small-diameter tube and said bellows has valleys interposed between adjacent peaks;
   wherein said large-diameter tube includes a surrounding portion that will surround an outer circumferential wall of said outer member, and a ridge disposed on an end of said surrounding portion facing said small-diameter tube and projecting diametrically inwardly from said surrounding portion;
   said ridge has an end face that will be held in abutment against an end face of said outer member when said outer member has been inserted within the large-diameter tube; and
   said bellows has a first peak closest to said large-diameter tube, said first peak connected to said ridge by a slanted base wall, the base wall extending from a base end that is interposed substantially equal distances between diametrically inner and outer ends of said ridge on an other end face of said ridge and the first peak;
   wherein the said first peak which is closest to said large-diameter tube is smaller in wall thickness than the remaining peaks and valleys, whereby the first peak is the most flexible peak of the bellows.

5. A joint boot according to claim 4, wherein said surrounding portion includes an inner circumferential wall having two annular ridges disposed thereon which are fitted in respective annular recesses defined in the outer circumferential wall of said outer member, or includes an inner circumferential wall having two annular recesses defined therein which are fitted over respective annular ridges disposed on the outer circumferential wall of said outer member.

6. A joint boot according to claim 5, wherein said surrounding portion includes an outer circumferential wall having an annular groove defined therein between said two annular ridges or said annular recesses in the inner circumferential wall of said surrounding portion.

7. A joint boot according to claim 4, wherein the peaks and valleys have curved crests.

* * * * *